UNITED STATES PATENT OFFICE.

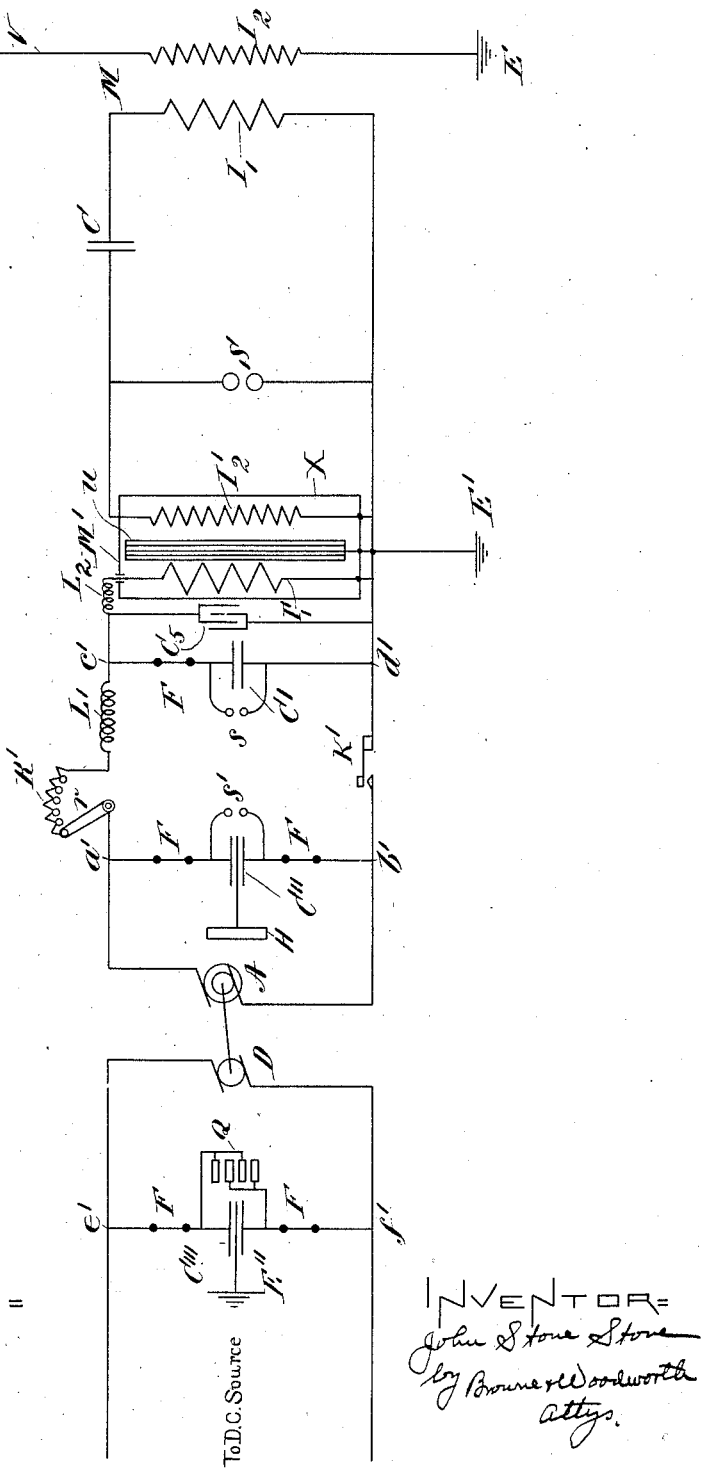

JOHN STONE STONE, OF BOSTON, MASSACHUSETTS.

SPACE TELEGRAPHY.

946,168.  Specification of Letters Patent.  Patented Jan. 11, 1910.

Original application filed February 27, 1906, Serial No. 303,213. Divided and this application filed March 12, 1908. Serial No. 420,591.

*To all whom it may concern:*

Be it known that I, JOHN STONE STONE, a citizen of the United States, and a resident of Boston, in the county of Suffolk and State of Massachusetts, have invented a new and useful Improvement in Space Telegraphy, of which the following is a specification.

My invention relates to space telegraphy and its object is to provide means for increasing the power factor of the primary power circuit of a space telegraph transmitting system.

My invention may best be understood by having reference to the drawing which accompanies and forms a part of this specification, and which illustrates certain apparatus and circuit arrangements embodying my invention; but it will be understood that my invention is not limited to the particular embodiments thereof which are illustrated in said drawing, inasmuch as my invention may be subjected to a wide range of variation without departing from the principle thereof.

In the drawing, the figure diagrammatically represents a space telegraph transmitting system.

In the figure, D A is a motor-generator comprising a direct-current motor D and an alternating-current generator A; V is an elevated conductor; E' E'' are earth connections; M M' are transformers; $I_1$ $I_1'$ are transformer primaries; $I_2$ $I_2'$ are transformer secondaries; C C' C'' C''' $C_5$ are condensers; S $s$ $s'$ are spark-gaps; Q is a lightning arrester; F F are fuses; R' is a rheostat; K' is a key.

The circuit S C $I_1$ is a sonorous or persistently oscillating circuit inductively associated with the elevated conductor system V $I_2$ E by means of the transformer M whose windings $I_1$ $I_2$ preferably are so spatially related as to render the period of said sonorous circuit practically independent of the electromagnetic constants of said elevated conductor system, as more fully explained in my U. S. Letters Patent No. 767,984, dated Aug. 16, 1904. The circuit containing the alternator A and the primary $I'_1$ of the transformer M' is the primary power circuit, the energy of which is delivered at the desired tension to said sonorous circuit by means of said transformer. The motor-generator is energized by any suitable source of direct current, to the mains of which the motor D is connected.

For the purpose of protecting the armature windings of the alternator A, I connect the branch circuit $a'$ $b'$ across the terminals of said alternator and connect one armature of the condenser $C''$ included in said circuit to the frame H of the alternator, so that any electrical oscillations which may be created in the primary power circuit by the reaction of the sonorous circuit thereon, will be prevented from creating a difference of potential between said armature windings and the metallic parts of the alternator which lie adjacent to said windings. In order to protect the condenser $C''$ from the effects of excessive oscillating potentials which may be developed between the points $a'$ and $b'$, I connect a spark-gap $s'$ across the terminals of said condenser. In order to protect the alternator from excessive currents which may be developed in the primary power circuit in case of condenser breakdown or arc at the spark-gap $s'$ caused by the reaction of the sonorous circuit thereon or from any other cause I may connect a fuse F on either side of the condenser $C''$ in the branch $a'$ $b'$.

A branch $c'$ $d'$ is connected across the terminals of the primary $I'_1$ of the transformer M' and is connected to earth at E'. A spark-gap $s$ is connected across the armatures of the condenser C' which is included in said branch $c'$ $d'$. By means of said branch $c'$ $d'$ and its connection to earth $d'$ E', the primary $I'_1$ of the transformer M' and the armature of the alternator A are protected from excessive potentials or currents developed in the primary power circuit by the reaction thereon of the sonorous circuit S C $I_1$. For the purpose of further protecting said primary power circuit as above set forth from excessive currents a fuse F may be connected on one side of the condenser C', but obviously is not needed on the earthed side thereof. Both condensers C' and $C''$ should be so proportioned that each of the branches $a'$ $b'$ and $c'$ $d'$ should have for the frequency of the power current an impedance high as compared to its impedance for the frequencies of the oscillations developed in the sonorous or oscillating circuit.

When a direct-current source is employed as indicated in the figure, the sparking at the commutator of the direct-current generator creates oscillatory surgings in the mains and these surgings being of relatively high frequency and having considerable amplitude will create currents in the receiving system which generally is located in close proximity to the transmitting system and which sometimes is intimately associated therewith. For the purpose of eliminating the effect on the receiving system and its oscillation responsive device of such relatively high frequency oscillatory surgings I may connect the branch $e'$ $f'$ across the motor side of the motor-generator D A for conducting to earth the currents developed in the motor circuit by the sparking at the commutator of the generator which supplies the mains to which the motor is connected or the currents induced in said motor circuit by the surgings created in a neighboring direct-current transmission system. For this purpose the condenser $C'''$ may be serially included in the branch $e'$ $f'$ and one of its armatures may be earthed as shown at $E''$. A fuse F may be included in said branch $e'$ $f'$ on either side of the condenser $C'''$ and a lightning arrester Q may be shunted across the terminals of said condenser.

The condenser $C_5$, shown in the present instance as connected across the terminals of the primary of the transformer $M'$, has its capacity so related to the inductance of the primary power circuit as to reduce the impedance of the primary power circuit for currents of the frequency developed therein by the alternator A and thereby increase the power factor of said circuit. Obviously the condenser $C_5$ may be arranged in other ways for effecting this result. It will of course be understood that, in general, the capacity of the condenser $C_5$ is larger than the capacity of either of the condensers $C'$ $C''$.

In order to increase the power factor of the primary power circuit and render said power factor constant over a wide range of the secondary circuit current values I may include the inductance $L_2$ between one terminal of the primary $I'_1$ and one terminal of the condenser $C_5$ and arrange said inductance so that it will be out of inductive relation with the secondary $I'_2$ as shown. In such case an inductance coil $L_1$ may be introduced in the primary power circuit as a means of assisting the condenser $C_5$ and inductance coil $L_2$ in maintaining the power factor of the primary circuit high and approximately constant for varying loads in the secondary or sonorous circuit. For this purpose the inductance of the coil $L_1$ plus the inductance of the armature of the generator A should equal approximately the sum of the inductance of the coil $L_2$ and the apparent inductance of the primary $I'_1$ of the transformer $M'$. The coil $L_2$ in this case serves to compensate for variations in the apparent or effective inductance of the primary $I'_1$ due to varying loads in the secondary circuit, and therefore maintains the inductance of the branch consisting of the primary $I'_1$ and the coil $L_2$ more nearly constant for varying loads on the transformer.

A rheostat comprising the contact arm $r$ and resistance $R'$ may, as shown, be included in the circuit of the generator A and primary $I'_1$ to control the supply of energy to the transformer $M'$.

The core $u$ of the transformer $M'$ preferably is laminated. One terminal of both the primary and secondary may be connected with said core which is earthed at $E'$. The object in connecting the windings of said transformer to the core is to minimize differences of potential which otherwise might arise between the core and portions of the windings most nearly adjacent thereto. The entire transformer $M'$ may be inclosed in a jacket X of tin or other suitable material and sealed in with a molded sealing compound of high dielectric strength. The jacket likewise may be connected with one terminal of the primary and secondary windings of the transformer $M'$ and with the laminated iron core $u$, and may be earthed at $E'$.

This application is a division of my application Serial No. 303,213, filed February 27, 1906.

I claim—

1. A space telegraph transmitting system comprising in combination a sonorous circuit, a discharger for said sonorous circuit, a power-circuit, a transformer having its primary connected to said power-circuit and its secondary connected to said sonorous circuit, and means associated with said power-circuit for increasing the power factor of said power-circuit.

2. A space telegraph transmitting system comprising in combination a sonorous circuit, a discharger for said sonorous circuit, a power circuit, a transformer having its primary connected to said power-circuit and its secondary connected to said sonorous circuit, and means associated with said power-circuit for rendering the power factor of said power-circuit unity.

3. A space telegraph transmitting system comprising in combination a sonorous circuit, a discharger for said sonorous circuit, a power-circuit, a transformer having its primary connected to said power-circuit and its secondary connected to said sonorous circuit, and a condenser associated with said power circuit, said condenser having its capacity so related to the inductance of the power-circuit as to increase the power factor of said power-circuit.

4. A space telegraph transmitting system comprising in combination a sonorous circuit, a discharger for said sonorous circuit, a power-circuit, a transformer having its primary connected to said power-circuit and its secondary connected to said sonorous circuit, and a condenser associated with said power circuit, said condenser having its capacity so related to the inductance of the power-circuit as to reduce the impedance of said circuit for currents of the frequency developed therein.

5. A space telegraph transmitting system comprising in combination a sonorous circuit, a discharger for said sonorous circuit, a power-circuit, a transformer having its primary connected to said power-circuit and its secondary connected to said sonorous circuit, means associated with said power-circuit for increasing the power factor of said power-circuit, and means for rendering said power-factor constant for varying loads on said secondary.

6. In a space telegraph transmitting system, a power circuit including a generator and the primary of a transformer, an inductance coil connected in series therewith and so located as to be out of inductive relation with the secondary of said transformer, a condenser connected across said primary and said inductance coil, and another inductance coil in series with the armature of said generator and said primary, and so proportioned that the sum of the inductances of the armature of said generator and the last mentioned coil is approximately equal to the sum of the inductance of the first mentioned coil and the apparent inductance of said primary when said secondary is loaded.

In testimony whereof, I have hereunto subscribed my name this 4th day of March, 1908.

JOHN STONE STONE.

Witnesses:
CHARLES C. KURTZ,
GEO. K. WOODWORTH.